United States Patent [19]
Larsson

[11] 4,041,743
[45] Aug. 16, 1977

[54] HIGH PRESSURE PRESS
[75] Inventor: Hans Gunnar Larsson, Vasteras, Sweden
[73] Assignee: ASEA Aktiebolag, Vasteras, Sweden
[21] Appl. No.: 633,843
[22] Filed: Nov. 20, 1975
[30] Foreign Application Priority Data
   Dec. 6, 1974   Sweden .............................. 7415294
[51] Int. Cl.² .............................................. B21D 72/10
[52] U.S. Cl. ................................ 72/60; 72/DIG. 31; 72/272
[58] Field of Search ................. 72/272, 63, 60, 56, 72/DIG. 31; 277/188 R, 188 A, 58
[56] References Cited
   U.S. PATENT DOCUMENTS 3,126,096   3/1964   Gerard .......................... 72/DIG. 31
   3,392,562   7/1968   Fuchs, Jr. ............................. 72/60
   3,707,864   1/1973   Pigett et al. ......................... 72/272
   3,914,981   10/1975  Nilsson et al. ........................ 72/60
   3,934,442   1/1976   Larker et al. ................... 72/DIG. 31

FOREIGN PATENT DOCUMENTS 1,170,931   11/1969   United Kingdom .................... 72/60

Primary Examiner—Leon Gilden
Attorney, Agent, or Firm—Watson, Cole, Grindle & Watson

[57] ABSTRACT

A press for hydrostatic extrusion includes a pressure chamber for enclosing a pressure medium which is formed of a high pressure cylinder, a pressure generating piston, a die and a die support and seals. The die support includes an exchangeable support ring which engages the end surface of the liner and bridges the gap between the liner and the die. A metallic sealing ring is arranged within the liner in engagement therewith, forming a gap between the inner surface of the sealing ring and the outer surface of the die or die support. The die support has a groove in its upper surface which contains a sealing member against which the edge of the metallic sealing ring engages. The lower outer corner of the metallic sealing ring is bevelled to form a space which communicates with the outside of the press.

6 Claims, 4 Drawing Figures

HIGH PRESSURE PRESS

BACKGROUND OF THE INVENTION

1. Field of the Invention

The invention relates to presses for hydrostatic extrusion with a die support and particularly to sealing such presses at the die end.

2. The Prior Art

In presses for hydrostatic extrusion, very high pressure levels are used; usually the working pressure is between 10 and 20 kbar. At this high pressure a reliable seal must be achieved between the inner wall of a press cylinder and a die or a die support and between the inner wall of the cylinder and a punch or piston projecting into the cylinder, said punch or piston, when it is inserted into the cylinder, producing the high extrusion pressure in a pressure medium which is enclosed in a pressure chamber formed of the cylinder, the die and the piston. A billet to be extruded is located in the pressure chamber and is pressed out through the die under the effect of a pressure medium. On raising the pressure from atmospheric level to the extrusion level, the inner diameter of the cylinder increases by 0.5 to 1%, which requires a seal which is to prevent pressure medium from flowing out through a gap between the cylindrical wall and the piston and the die, respectively, which expands upon a pressure increase. Any leakage at the high pressures mentioned may involve severe damage to the die or the die support, which requires an exchange of these expensive parts. In U.S. Pat. No. 3,702,555 there is shown and described in more detail a press of the kind referred to in this invention. In Larker application Ser. No. 462,402, filed Apr. 19, 1974, and U.S. Pat. Nos. 3,865,387 and 3,877,707 there are shown different variations of high pressure seals for presses for hydrostatic extrusion, having a first sealing ring abutting the cylindrical wall and a seal holder and a second sealing ring sealing against a die or piston and a seal holder. These seals have meant a great improvement and have resulted in a great increase in the service life. However, certain drawbacks have remained.

Particular problems have been caused by the sealing ring, the inner surface of which seals against a die or a die support and the end surface of which seals against a seal holder, especially in the case of hot extrusion. In hot extrusion the die and the die support are heated by the billet which is heated up to 600° C, and expand so that the contact force between these parts and the surrounding sealing ring becomes very high. When removing the die or support, cutting has been obtained. Any scratches occurring have meant that no sealing has been obtained in the subsequent pressing.

SUMMARY OF THE INVENTION

These problems are removed by means of a new construction of the die support, which makes possible sealing without using the said sealing ring around the die or die support. The present invention relates to a particularly advantageous embodiment of the die support of the press with regard to the sealing between said die support and the die.

The press according to the invention comprises a die support with a surface which is pressed against the liner of the press cylinder and a support surface for the press die, against which the end surface of the die bears in a sealing manner. Thus, the die support bridges the gap between the cylindrical wall and the outer cylindrical surface of the die. According to the invention, the part of the die support bridging said gap consists of an easily exchangeable support ring which completely or partly carries the die. The ring is suitably quite plane on both sides so that it may be turned. The support ring can advantageously be clamped in a ring which is attached in a particular manner, with which ring it is centered and fastened to the main portion of the die support. According to the invention, the advantage is obtained that the surface against which the die seals is located on an easily exchangeable machine element, which can easily be machined into the desired dimension and surface finish. When a leakage has caused damage which makes sealing impossible, the ring can be turned or can easily be replaced by a new one. A damaged support ring can be easily re-ground and be used again. By exchanging the support ring, the die support can be easily adjusted to another die. In the event a die is used which has an end surface resting on the support ring and an end surface resting on the main portion of the die support, it may be necessary to use fitting rings of different thicknesses as the thickness of the support ring decreases during regrinding.

BRIEF DESCRIPTION OF THE DRAWINGS

The invention will be described in more detail with reference to the accompanying drawing.

DESCRIPTION OF THE PREFERRED EMBODIMENTS

Figure 1:
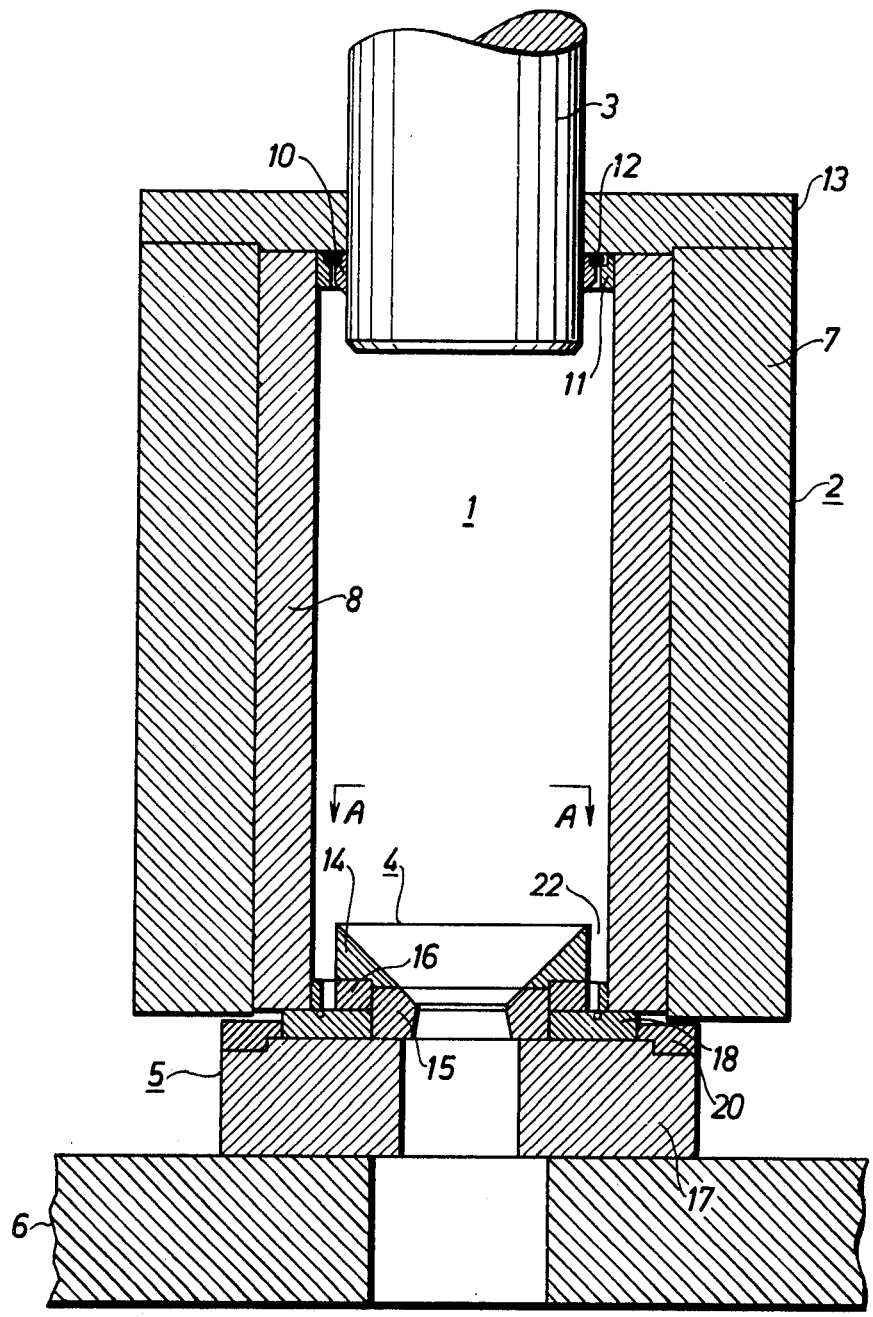
FIG. 1 shows schematically a pressure chamber in a hydrostatic extrusion press.
Figure 2:
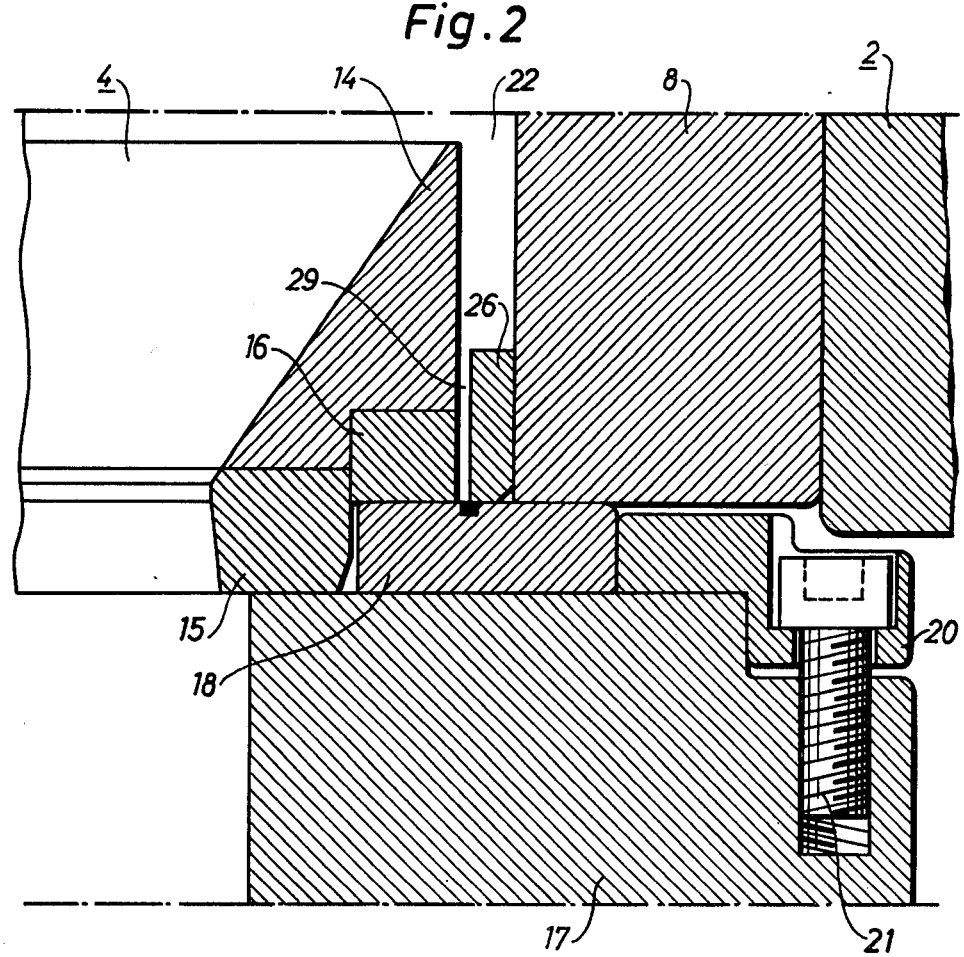
FIG. 2 shows on a larger scale the encircled portion in FIG. 1.
Figure 3:
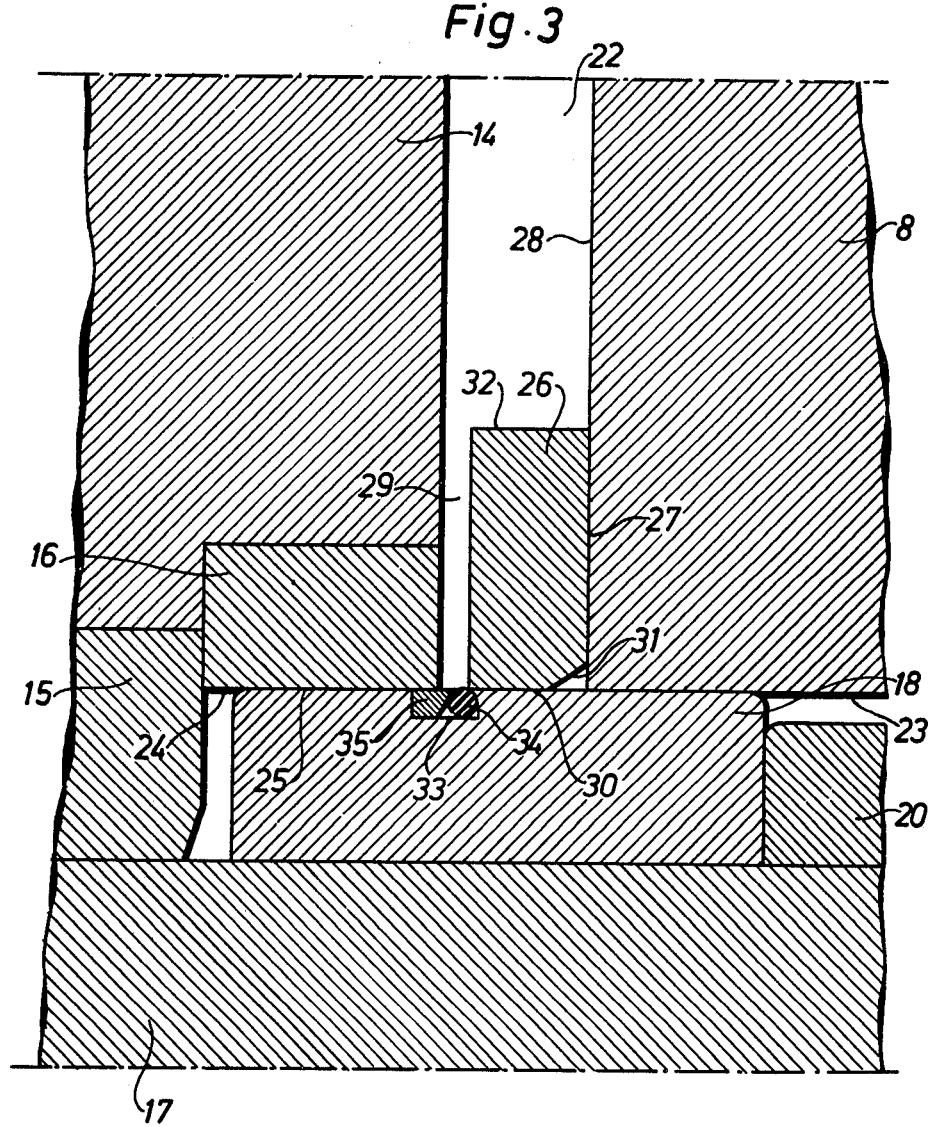
FIG. 3 shows on a still larger scale the die support and the seal at the die end of the pressure chamber and FIG. 4 shows a plan view of the press illustrating the configuration of the various elements.
Figure 4:
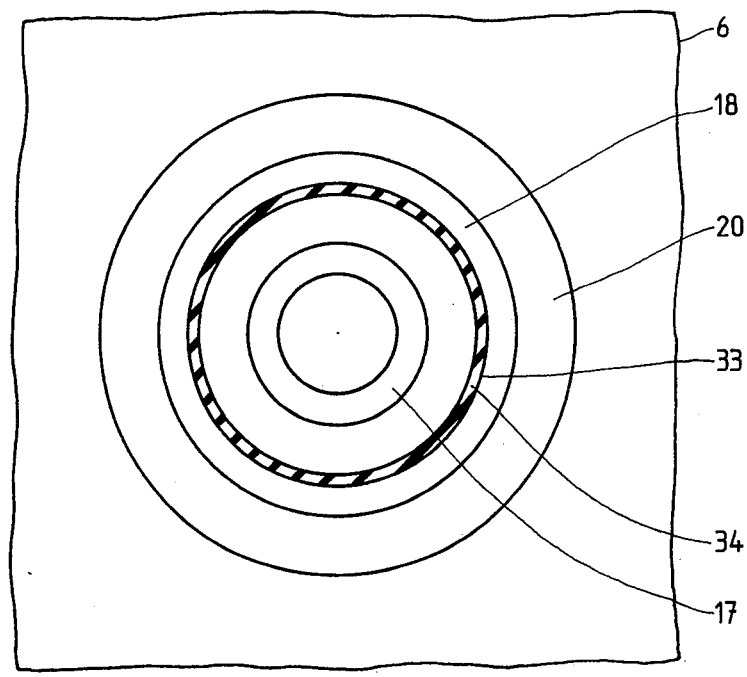

In the figures, 1 designates a press chamber which is formed of a high pressure cylinder 2, a pressure generating piston 3, a die 4 and a die support 5 resting against a yoke 6 in a press, the rest of which is not shown. The high pressure cylinder 1 comprises a cylinder 7, which may be built up in a manner known per se of a tube and prestressed wires or strips wound around said tube, and a liner 8 inserted in the cylinder 7. Between the piston 3 and the liner 8 there is a seal consisting of two metal rings 10 and 11 and an O-ring 12. The end piece 13 of the cylinder 2 also forms a support for the seal. The die 4 consists of a preforming part 14 and an end forming and calibrating part 15 and of a suitably prestressed ring 16 keeping these two parts 14 and 15 together. The die support 5 comprises a strong annular part 17, an exchangeable support ring 18 and an attachment ring 20 arranged around said support ring 18 in a prestressed manner, said ring 20 being joined to the part 17 by a number of bolts 21.

The ring 18 of the die support bridges the gap 22 between the parts 14 and 16 of the die and the liner 8. The ring 18 is pressed against the end surface 23 of the liner 8. The end surface 24 of the die ring 16 seals against the upper surface 25 of the ring 18. As opposed to previously used rings, there is only one single metallic sealing ring 26 in the gap 22, the outer surface 27 of said ring 26 sealing against the inner surface 28 of the liner 8, since the unloaded condition the ring has a larger diameter than the liner and is prestressed when it is being inserted. Between the sealing ring 26 and the die there is a gap 29 in which the sealing members used heretofore are absent. The plane end surface 30 of the sealing ring 26 makes contact with the upper surface 25 of the support ring 18 of the die. At one corner the sealing ring 26 is made with a bevel 31. The ring-shaped space formed by the bevel 31 is ventilated towards the atmosphere. The pressure acting on the end surface 32 above the bevel 31 will be distributed along the plane end surface 30 of the ring 26, by which means the contact pressure between surfaces 30 and 25 will exceed the fluid pressure inside the high pressure chamber 1, thus obtaining good sealing. In the ring 18 there is an annular groove 33, in which there is a sealing ring 34 which provides initial sealing between the ring 18 and the ring 26. The sealing ring 34 can be fixed in the groove by a locking ring 35 with an oblique outer side surface. The sealing ring 34 may be a so-called O-ring, but another shape which also provides initial sealing between the ring 16 and the support ring 18 may be used.

I claim:

1. Press for hydrostatic extrusion comprising a press chamber adapted for enclosing a pressure medium said press chamber being formed of a high pressure cylinder with an inner liner, a piston movable into the cylinder at one end for effecting pressurization of an enclosed pressure medium, a die and a die support at the other end of the cylinder, and sealing means for preventing the pressure medium from escaping between the cylinder and the piston and die and die support at the ends thereof, in which there is a gap between the liner and the die, and in which the die support comprises an exchangeable support ring which engages the end surface of the liner of the high pressure cylinder and bridges the gap between the liner and the die and constitutes a support for the die against which one end surface of the die seals.

2. Press according to claim 1, having an attachment ring for securing the support ring to the main portion of the die support, said attachment ring surrounding the support ring.

3. Press according to claim 2, in which the support ring is turnable.

4. Press according to claim 2, in which the support ring is attached to the attachment ring in a prestressed manner.

5. Press according to claim 1, in which said support ring has a constant thickness and plane parallel end surfaces.

6. Press according to claim 1, in which the support ring supports the die in the area nearest to its periphery, and the main portion of the die support supports the central part of the die.

* * * * *